(12) United States Patent
Ando et al.

(10) Patent No.: US 6,200,138 B1
(45) Date of Patent: Mar. 13, 2001

(54) GAME DISPLAY METHOD, MOVING DIRECTION INDICATING METHOD, GAME APPARATUS AND DRIVE SIMULATING APPARATUS

(75) Inventors: Takeshi Ando; Kazunari Tsukamoto; Toshiya Yamaguchi; Tomoya Takasugi; Masaaki Ito; Toshikazu Goi, all of Tokyo (JP)

(73) Assignee: Sega Enterprises, Ltd., Tokyo (JP)

( * ) Notice: Subject to any disclaimer, the term of this patent is extended or adjusted under 35 U.S.C. 154(b) by 0 days.

(21) Appl. No.: 09/182,989

(22) Filed: Oct. 30, 1998

(30) Foreign Application Priority Data

Oct. 30, 1997 (JP) .................................................. 9-298852
Oct. 28, 1998 (JP) ................................................ 10-307321

(51) Int. Cl.⁷ ................................................... G09B 19/16
(52) U.S. Cl. ........................... 434/61; 434/307 R; 434/69; 434/29; 273/148 B; 273/442; 463/31; 463/23
(58) Field of Search .................... 434/61, 247, 307 R, 434/69, 29, 70, 308, 305; 273/148 B, 442; 348/121; 345/8; 463/23, 30, 31, 32

(56) References Cited

U.S. PATENT DOCUMENTS 5,547,382  *  8/1996  Yamasaki et al. ................. 434/61 X
5,618,179  *  4/1997  Copperman et al. .............. 434/69 X

* cited by examiner

*Primary Examiner*—Michael O'Neill
*Assistant Examiner*—Chanda Harris
(74) *Attorney, Agent, or Firm*—Dickstein Shapiro Morin & Oshinsky LLP

(57) ABSTRACT

A game display method displays a driving game which permits characters to be present in a city and can prevent cruel images of collisions with characters. Characters in a dangerous area are intentionally moved away from a motorbike B. Those H1, H2 of the characters behind the motorbike B as viewed in a moving direction of the motorbike B are intentionally moved away from a current position 01 of the motorbike B, a position of the center of the motorbike B. Those H3, H4, H5 of the characters in front of the motorbike B as viewed in the moving direction of the motorbike B are intentionally moved toward the back of the motorbike B, i.e., directions normal to a straight line interconnecting the position 01 of the center of the motorbike B and the characters H3, H4, H5. The characters H3, H4, who are forward left of the motorbike B, are moved left, and the character Hr, who is forward right, is moved right.

26 Claims, 14 Drawing Sheets

GAME DISPLAY METHOD, MOVING DIRECTION INDICATING METHOD, GAME APPARATUS AND DRIVE SIMULATING APPARATUS

BACKGROUND OF THE INVENTION

The present invention relates to a game display method for displaying a game in which a movable object is moved in a virtual space, a direction display method for displaying a moving direction in which the movable object is moved to a destination in a virtual space, a game apparatus for displaying the game and the moving direction, and a drive simulating apparatus for operators simulating the drive.

The conventional race game apparatuses installed in amusement facilities, etc. are largely sorted in two kinds. In the race game apparatuses of one kind, one main road extended from a point A to a point B is set, and game players compete in times they take to arrive at the point B from the point A. In the race game apparatuses of the other kind, a circuit course is set, and game players drive along the circuit course at preset times to compete in their required periods of time. Some of such game apparatuses include drive simulation apparatuses for simulating drives of motor bikes, automobiles, etc. Such game apparatuses can make game players feel as if they actually ride and drive the motor bikes, automobiles, etc., and can give actual feeling and are very popular.

Although the conventional race game apparatuses are elaborate in the course setting and the drive simulation apparatuses, principles of the race games are not known, and innovational race games are keenly expected. In response to this expectation are proposed new race game apparatuses in which, in place of the courses set in the conventional race game apparatuses, a town of a large city is produced in a virtual space, and game players can drive freely in places other than streets, which are in the town.

In a case that the free drive in the town is enabled, the game players might collide with people in the virtual space, but images of hitting people must be avoided, because recently it is strongly required to avoid cruel game images. To avoid such images it is considered that no person is present in the virtual space, but it is unnatural that no person is present in a town, which might make it unrealistic. It is possible to make images in which when the game players collide with people, they pass through the people, but undeniably such images are unnatural.

In the case that the free drive in the town is enabled, the game players might be lost, and it is necessary to indicate to the game players directions to destinations. In this case easily understandable direction indications are necessary.

Furthermore, race game apparatuses do not provide game players with life like driving sensations. Accordingly, there is a need for race game apparatuses which provides game players with a more realistic environment.

SUMMARY OF THE INVENTION

One object of the present invention is to provide a game display method and an apparatus which permits people to be present in virtual space, such as a city or others, while not permitting cruel images, as of colliding with the people to be avoided.

Another object of the present invention is to provide a moving direction indication method which can make direction indications which are easy to be understood by operators freely moved in the virtual space, such as a city or others, and a game apparatus.

Further another object of the present invention is to provide a game display method and a game apparatus which can make displays which are easily understandable for an operator who gets, in a virtual space, such as a city or others, a specific object and carries the object to a destination.

Further another object of the present invention is to provide a drive simulation method which can provide real driving feeling.

The above-described object can be achieved by a game display method for displaying a game in which a movable object is moved in a virtual space, comprising the steps of: setting a dangerous area around the movable object; and when a character enters the dangerous area, moving the character in a direction in which the character is moved away from the movable object. Cruel images of collisions of the movable object with the character can be prevented.

In the above-described game display method it is possible that a caution area is set around the dangerous area, and when a character enters the caution area, the character is caused to pause. In a case that after the pause the character moves away from the approaching movable object, his moving-away motion can appear smooth, and at the same time the character can be prevented from unintentionally moving into a dangerous area.

In the above-described game display method it is possible that the dangerous area is set to cover an area in a direction of movement of the movable object, based on a moving direction of the movable object and/or a moving speed thereof. A dangerous area can be set in accordance with drive of the movable object.

The above-described object can be achieved by a game display method for displaying an object in a virtual space, comprising the steps of: setting an area around a first object; and when a second object enters the area, moving the second object outside the area, based on positional information of the first object and positional information of the second object. Collision of the first object with the second object can be prevented.

In the above-described game display method it is possible that when the second object enters the area, the second object is moved in a direction intersecting at a prescribed angle to a direction interconnecting a reference position of the first object and a reference position of the second object. Collision of the first object with the second object can be prevented without awkward movement.

The above-described object can be achieved by a game display method for moving to a destination in a virtual space a movable object which is moved in the virtual space, comprising the step of: displaying at a prescribed position in the virtual space a virtual object which indicates a direction from the prescribed position to the destination. Direction indications can be simply made.

The above-described object can be achieved by a moving direction display method for displaying a moving direction of a movable object which is moved in a virtual space to a destination therein, comprising the steps of: setting in the virtual space a plurality of moving direction indicating positions for indicating moving directions; and displaying arrows which are directed from the direction indicating positions to the destination being displayed and are not dependent on positional relationships between the direction indicating positions and the movable object when the movable object comes near to the direction indicating positions, whereby a moving direction for the movable object to move on is indicated. Moving direction indications can be readily understandable to operators freely driving in a city can be made.

In the above-described moving direction display method it is possible that the direction indicating positions are set at intersections of movement ways in the virtual space. Moving direction indications can be more understandable.

The above-described object can be achieved by a game apparatus for executing a game in which a movable object is moved in a virtual space, comprising: setting means for setting a dangerous area around the movable object; and display means which, when a character enters the dangerous area, the character is displayed to move in a direction in which the person moves away from the movable object.

In the above-described game apparatus it is possible that the setting means sets a caution area around the dangerous area; and the display means which, when a character enters the caution area, displays the character to pause.

In the above-described game apparatus it is possible that the setting means sets the dangerous area to cover an area in a moving direction of the movable object, based on a moving direction of the movable object and/or a moving speed thereof.

The above-described object can be achieved by a game apparatus for executing a game in which a movable object is moved in a virtual space, comprising: setting means for setting an area around a first object; and display means which, when a second object enters the area, displays the second object to move outside the area, based on positional information of the first object and positional information of the second object.

In the above-described game apparatus it is possible that the display means displays the second object to move in a direction intersecting at a prescribed angle to a direction interconnecting a reference position of the first object and a reference position of the second object.

The above-described object can be achieved by a game apparatus for executing a game in which a movable object which is moved in a virtual space is moved to a destination in the virtual space, comprising: display means for displaying at a prescribed position in the virtual space a virtual object indicating a direction from the prescribed position to the destination.

The above-described object can be achieved by an electronic device for displaying a moving direction of a movable object being moved to a destination in a virtual space, comprising: setting means for setting in the virtual space a plurality of moving direction indicating positions for indicating moving directions; and display means for displaying direction indicating objects which, when the movable object comes near the direction indication position, are directed from the moving direction indicating positions to the destinations and are not dependent on positional relationships between the moving direction indicating positions and the movable object, the direction indicating objects indicating moving directions for the movable object to move in.

The above-described object can be achieved by a driving direction display method for displaying a driving direction for a movable object to drive to a destination in a virtual space, when a current position of the movable object is away from the destination by a prescribed distance, a direction indicating object which is along a driveway from the current position to the destination being displayed, and when the current position of the movable object is within the prescribed distance from the destination, a direction indicating object directed from the current position to the destination being displayed, whereby the driving direction of the movable object is indicated. Displays which are easily understandable to an operator operating to move the movable object to a destination in a virtual space, such as a city or others.

The above-described object can be achieved by a driving direction display method for displaying a driving direction for a movable object to drive to a destination in a virtual space, when a current position of the movable object is away from the destination by a prescribed distance, a first direction indicating object which is along a driveway from the current position to the destination being displayed, and when the current position of the movable object is within the prescribed distance from the destination, a second direction indicating object directed from the current position to destination being displayed, whereby the driving direction of the movable object is indicated.

In the above-described driving direction indicating method, it is possible that the first direction indicating object and the second direction indicating object are different from each other in shape, color and/or display mode.

In the above-described driving direction indicating method, it is possible that effective sounds and/or screen display modes used when the current position of the movable object is away from the destination by a distance longer than the prescribed distance and used when the current position of the movable object is within the prescribed distance from the destination are different from each other.

The above-described object can be achieved by a display method for displaying a game in which a movable object which is movable in a virtual space is moved to a destination in the virtual space, at least when a current position of the movable object is within a prescribed distance from the destination, the destination is emphatically displayed.

The above-described object can be achieved by a display method for displaying a game in which a movable object which is movable in a virtual space gets a specific object at a prescribed position in the virtual space and is moved to a destination in the virtual space, wherein a position of the specific object is emphatically displayed.

The above-described object can be achieved by an electronic device for displaying a driving direction for a movable object to move to a destination in a virtual space, comprising: display means for, when a current position of the movable object is away from the destination by a prescribed distance, displaying a direction indicating object which is along a driveway from the current position to the destination, and, when the current position of the movable object is within the prescribed distance from the destination, displaying a direction indicating object directed from the current position to the destination, wherein the driving directions of the movable object being indicated by the direction indicating objects.

The above-described object can be achieved by an electronic device for moving a movable object which is movable in a virtual space to a destination in the virtual space, comprising: display means for, at least when a current position of the movable object is within a prescribed distance from the destination, emphatically displaying the destination.

The above-described object can be achieved by an electronic device for displaying a game in which a movable object which is movable in a virtual space gets a specific object at a prescribed position in the virtual space and is moved to a destination in the virtual space, comprising: display means for emphatically displaying a position of the specific object.

The above-described objects can be achieved by a drive simulating apparatus for an operator manipulating a handle on a saddle to simulate a movement, comprising: a handle shaft having the handle mounted on an end, and tilted left and right by manipulation of the handle; and a tiltable frame having the saddle mounted on, supporting a game player on the saddle and tilting left and right, interlocked with left and right tilt of the handle shaft.

The above-described objects can be achieved by a drive simulating apparatus for an operator manipulating a handle on a saddle to simulate a movement, comprising: a speaker is disposed on the tiltable frame and/or the handle shaft, at least lower components of engine sounds are outputted by the speaker to apply engine vibrations to the tiltable frame and/or the handle shaft. The ride can be more realistic.

DETAILED DESCRIPTION OF THE INVENTION

[A First Embodiment]

The race game apparatus according to a first embodiment of the present invention will be explained with reference to the drawings.

(Structure of the Race Game Apparatus)

Figure 1:
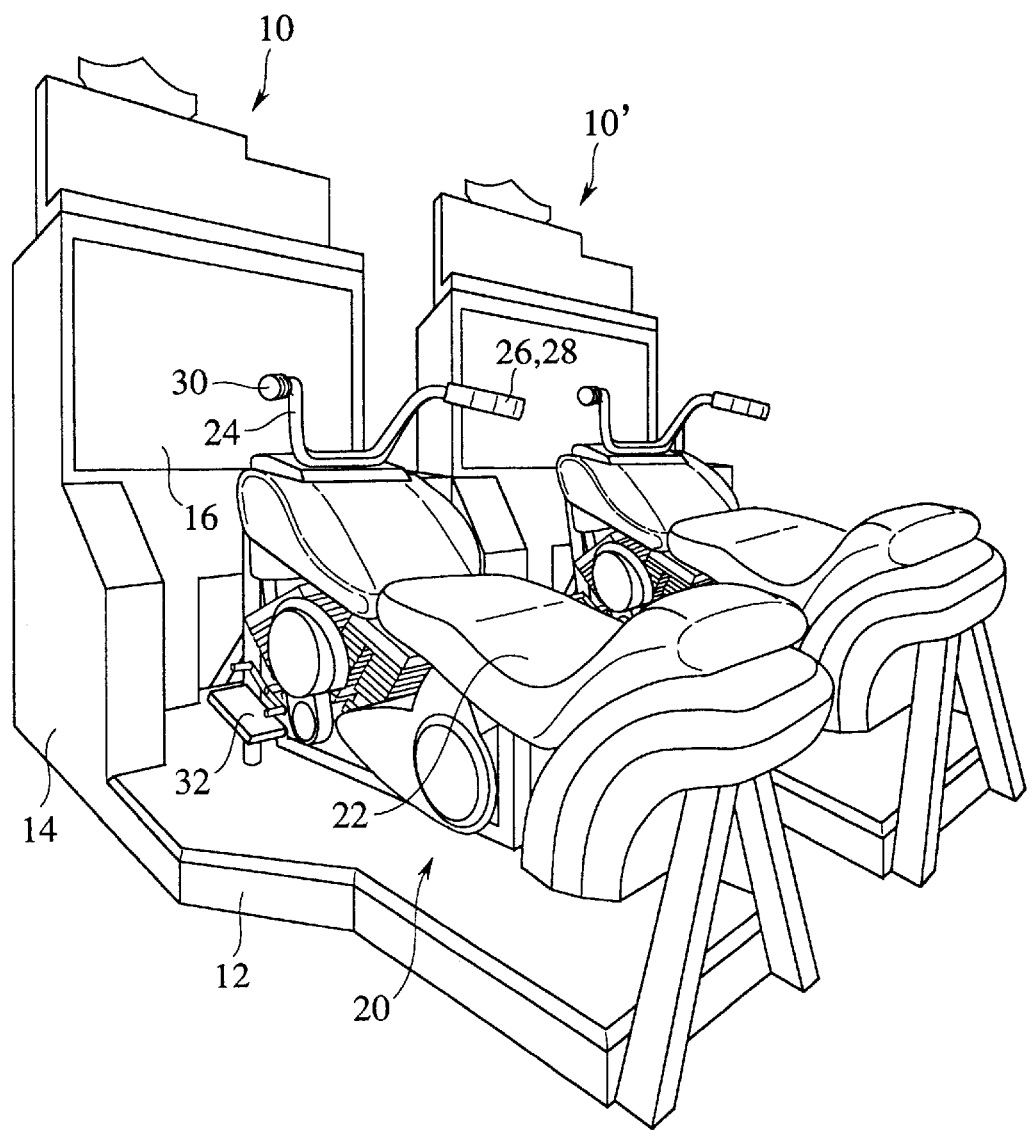
FIG. 1 is a perspective appearance view of the race game apparatus according to one embodiment of the present invention.
Figure 2:
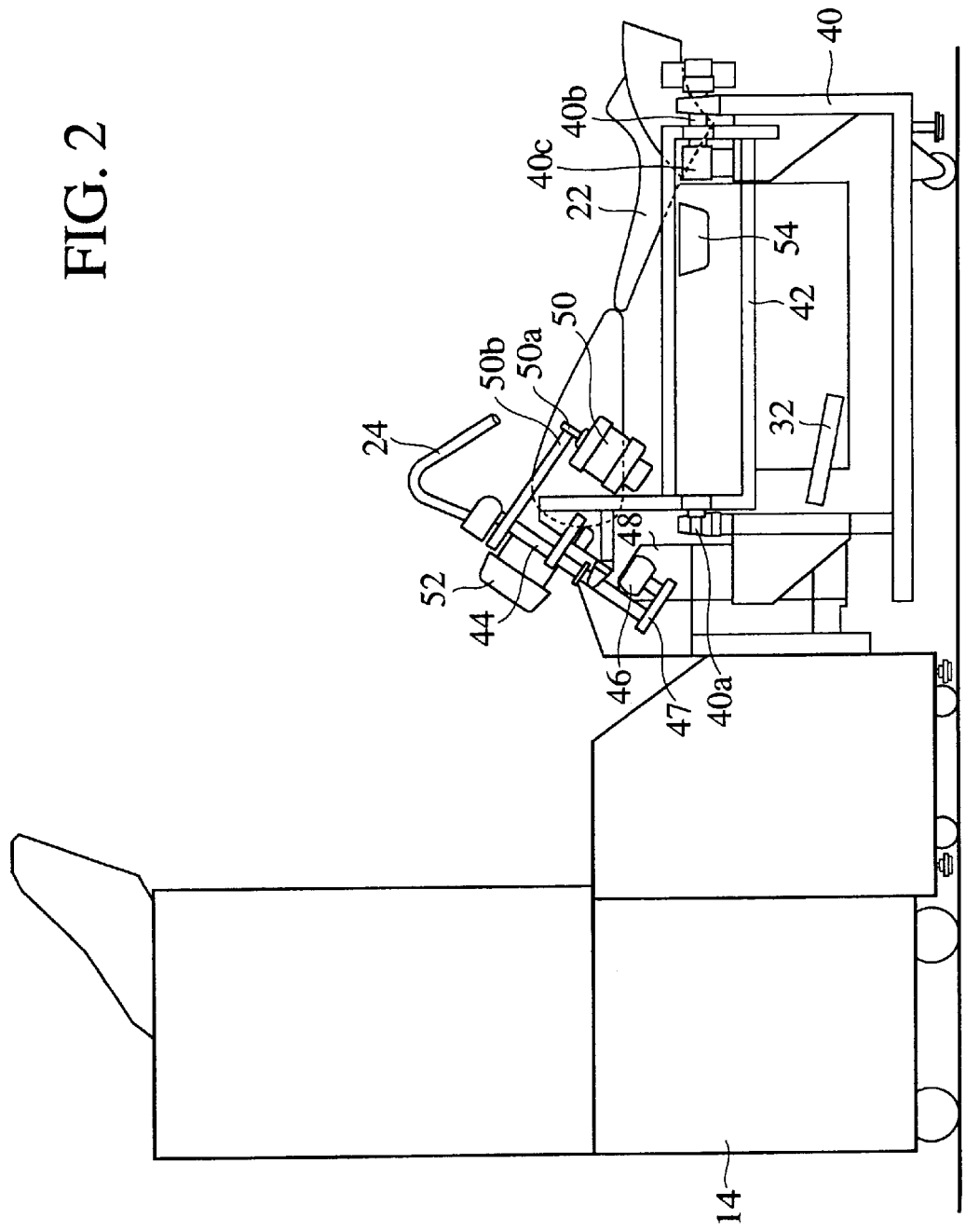
FIG. 2 is a side view of the drive simulating apparatus of the race game apparatus according to the embodiment of the present invention, which shows a structure thereof.
Figure 3:
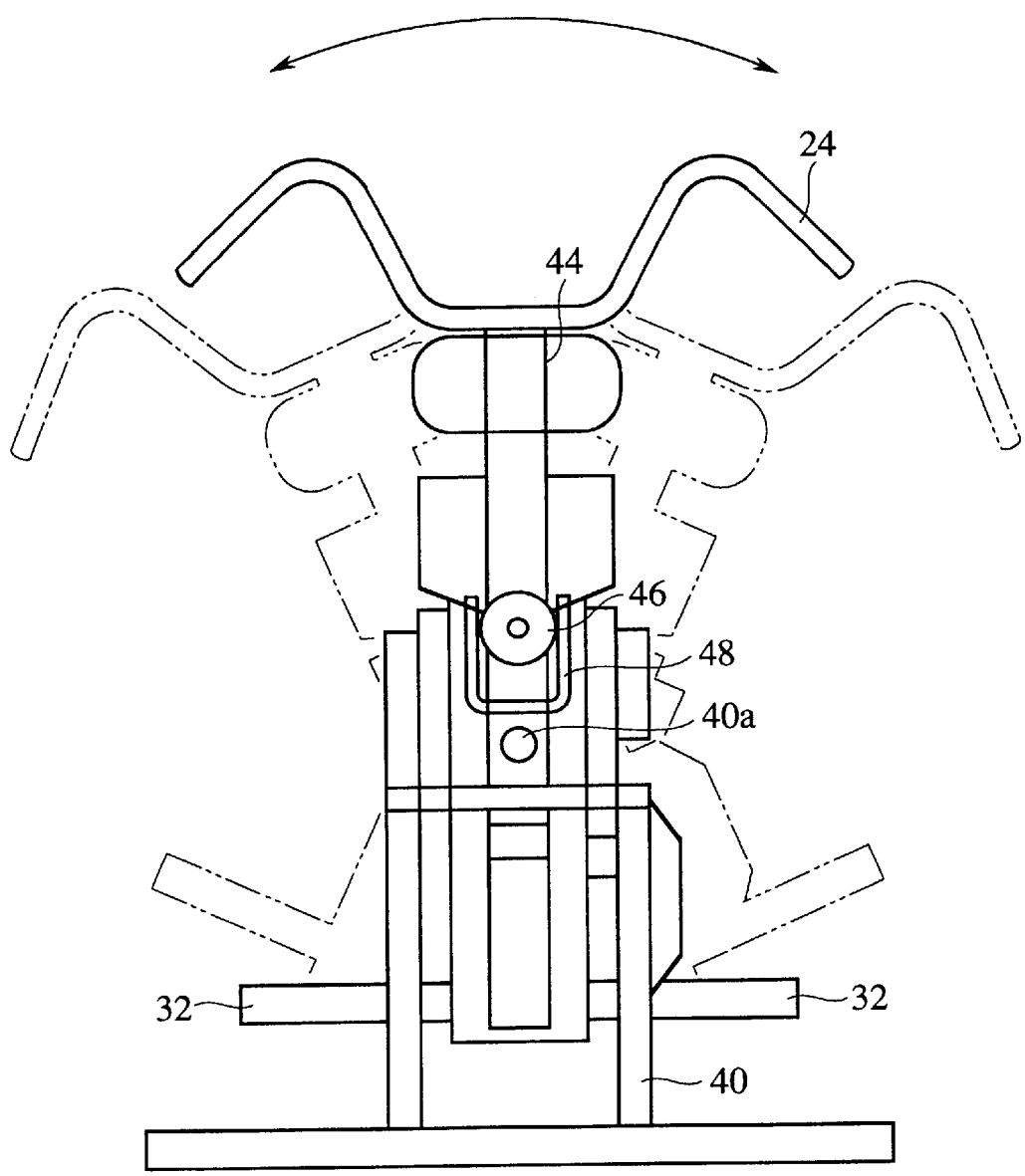
FIG. 3 is a front structural view of the drive simulating apparatus of the race game apparatus according to the embodiment of the present invention, which shows the structure thereof.
Figure 4:
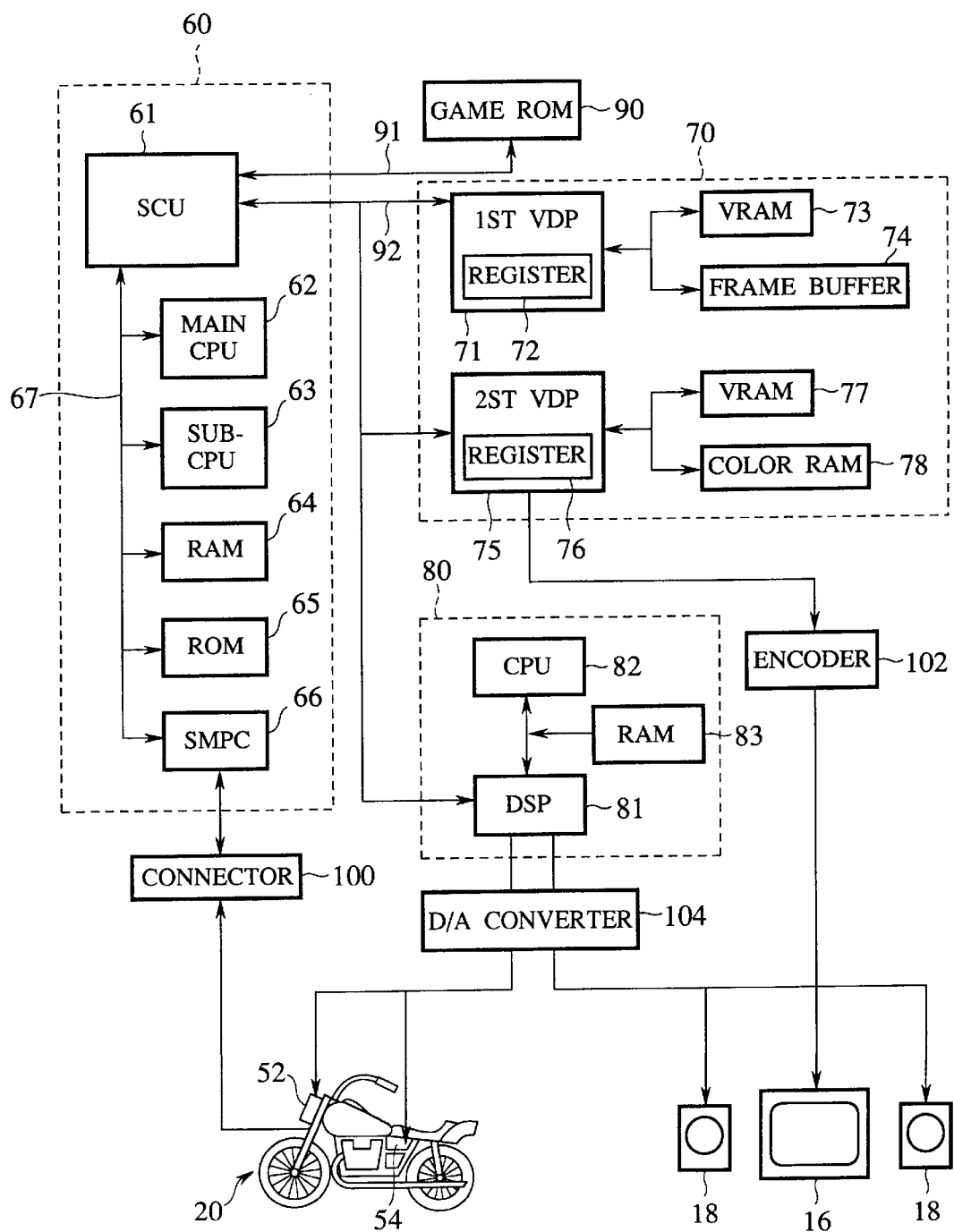
FIG. 4 is a block diagram of the race game apparatus according to the embodiment of the present invention.

A structure of the race game apparatus according to the present embodiment will be explained with reference to FIGS. 1 to 4. FIG. 1 is a perspective view of the race game apparatus according to the present embodiment, which shows an appearance thereof. FIG. 2 is a structural side view of the drive simulating apparatus of the race game apparatus according to the present embodiment, which shows a structure thereof. FIG. 3 is a front structural view of the drive simulating apparatus of the race game apparatus according to the present embodiment, which shows a structure thereof FIG. 4 is a block diagram of the race game apparatus according to the present embodiment.

As shown in FIG. 1, the race game apparatus 10 according to the present embodiment includes a casing 14 disposed on a base 12, and-the casing 14 accommodates a monitor screen 16 and speakers 18 (not shown). A drive simulating apparatus 20 for a game player to ride to operate is disposed on the base 12 in front of the monitor screen 16.

In the present embodiment the drive simulating apparatus 20 is in the form of a motorbike. A saddle 22 for a game player to sit on is provided at the center of the drive simulating apparatus 20, and a handle 24 is disposed on forward part of the base 12. A brake handle 26 and a throttle grip 28 are disposed on the right side of the handle 24, and a clutch is disposed on the left side of the handle. A foot rest 32 for a game player to rest the feet on is disposed below the saddle 22.

In amusement facilities, as shown in FIG. 1, a plurality of the race game apparatuses 10, 10' are juxtaposed with each other. The race game apparatuses 10, 10' are connected with each other by a connection cable (not shown) for communication competition. As shown in FIG. 2, a support frame 40 for the drive simulating apparatus 20 is secured to the casing 14 of the race game apparatus. A tiltable frame 42 is tiltably mounted on pins 40a, 40b of the support frame 42. The foot rest 32 and the saddle 22 are secured to the tiltable frame 42. A return spring 40c for returning the tiltable frame 42 to its normal position is disposed at the rear end of the pin 40b of the support frame 40.

A handle shaft 44 is mounted slant on the tiltable frame 42. A handle 42 is mounted on the upper end of the handle shaft 44. A fulcrum 46 is mounted on the lower end of the handle shaft 44 through a crank 47. The fulcrum 46 is pressed by a fulcrum presser 48. The fulcrum presser 48 is secured to the frame 40.

When the handle 24 is operated to tilt the handle shaft 44 left and right, because of the fulcrum 46 pressed by the fulcrum presser 48, as shown in FIG. 3 the tiltable frame 42 tilts left and right on the pins 40a, 40b, interlocked with the left and right tilt of the handle shaft 44. When the force ceases, the tiltable frame 42 is caused by the return spring 40c to return to its normal position.

An AC servo motor 50 is provided for tilting the handle shaft 44. The AC servo motor 50 is mounted on the tiltable frame 42, and a motor shaft 50a of the AC servo motor 50 is connected to the handle shaft 44 by a belt 50b. The AC servo motor 50 is driven to tilt the handle shaft 44.

To simulate the vibrations of engine sounds two bass speakers 52, 54 are provided. The bass speaker 52 is mounted on a forward part of the handle shaft 44. The bass speaker 54 is mounted on the tiltable frame 42 below the saddle 22. Lower component of engine sounds is outputted by the bass speakers 52, 54 to give subtle vibrations of the engine sounds to the drive simulating apparatus 20 for higher reality.

The race game apparatus includes a main control unit 60 for generally controlling the apparatus, a display control unit 70 for controlling display of game images, and a sound control unit 80 for generating effective sounds, etc.

The main control unit 60 includes an SCU (System Control Unit) 6, a main CPU 62, a sub-CPU 63, a ROM 65 and an SMPC (System Manager & Peripheral Control) 66 which are interconnected to each other by a bus 67.

The SCU 61 is connected by a bus 91 to a game ROM 90 storing a game program and by a bus 92 to the display control unit 70 and the sound control unit 80.

The SCU 61 controls input/output of data between the display control unit 70 and the sound control unit 80 through buses 91, 92. The main CPU 62 and the sub-CPU 63 execute in cooperation with each other the game program stored in the game ROM 90. The RAM 84 is used as a work area of the main CPU 62 and the sub-CPU 63 and temporarily stores the game program and character data. The ROM 65 stores programs, such as an initial program for initialization, etc., and data which are common with various games. The SMPC 66 is connected through a connector 100 to a brake lever 26, a throttle grip and a clutch lever 30 which are disposed in the handle 24 of the drive simulating apparatus 22.

The display control unit 70 includes a first VDP 71 for drawing polygonal images of characters and backgrounds, which are formed of polygon data, a VRAM 73 and a frame buffer 74 connected to the first VDP 71, a second VDP 75 for drawing scroll background images, image synthesis of polygon image data and scroll image data, based on display priority, a second VDP 75 for clipping, a VRAM 77 connected to the second VDP 75, and a color RAM 78.

The first VDP 71 incorporates a register 72. Drawing data of a polygon representing a character is supplied to the first VDP 71 through the main CPU 62 and are written in the VRAM 73. The drawing data written in the VRAM 73 is drawn in the frame buffer 74 for drawing. The data drawn in the frame buffer 74 is supplied, in a display mode, to the second VDP 75. The drawing and the display are switched for each frame.

On the other hand, information for controlling the drawing is supplied from the main CPU 62 to the first VDP 71 through the SCU 61 to be set in the register 72. Based on the control information set in the register 72 the first VDP 71 controls the drawing and the display.

The second VDP 75 incorporates a register 76. The image data is supplied from the main CPU 62 to the VRAM 77 and the color RAM 78 through the SCU 61 to be defined therein. Information for controlling the image display is supplied from the main CPU 62 to the resister 76 through the SCU 61 to be set therein. The data defined in the VRAM 77 is read based on the control information set in the register 76 of the second VDP 75 to be image data of scroll images representing backgrounds for characters. Image data of each scroll image, and image data of a polygon of a character supplied from the first VCP 71 is given a display priority, based on the control information set in the register 76 and is finally synthesized to be display image data.

The second VDP 75 reads out, based on display image data, color data defined in the color RAM 78 and produces display color data. The display color data is outputted to an encoder 102. The encoder 102 adds synchronization signals, etc. to the image data to produce picture signals and outputs the picture signals to a monitor apparatus 16. The monitor apparatus 16 display a synthesized image.

The sound control unit 80 includes a DSP 81 which synthesizing sounds by PCM or FM, a CPU 82 for controlling the DSP 81, and a RAM 83 for storing sound data. Sound data produced by DSP 81 is converted to a sound signal by a D/A converter 104 to be outputted by speakers 18. Engine sounds are outputted by the bass speakers 52, 54 to make the game player feel realistic.

In the present embodiment an object arranged in a three-dimensional virtual space is projected on a projection plane, and the projected image is displayed on the monitor apparatus 16. As exemplified in FIG. 5, when a three-dimensional object OBJ is arranged in a three-dimensional virtual space, the object OBJ is seen in perspective at a point of view 0, and an image information of the object OBJ obtained on the perspective coordinate system is projected on a projection plane PLN positioned at a prescribed distance from the point of view 0, and a two-dimensional projected image IMG on the projection plane PLN is displayed. The three-dimensional object OBJ is represented by a polyhedron divided in three-dimensional polygons forming the respective surfaces, and based on coordinates (X,Y,Z) of the summits of the polygons in the three-dimensional virtual space coordinates (Xs,Ys) of a figure to be drawn on the projection plane are computed by the following formulae.

$$Xs=(X/Z)\times h$$

$$Ys=(Y/Z)\times h$$

In displaying a game motorbike, a city, such as buildings, etc., arrows, etc. are displayed in a three-dimensional virtual space with points of view being changed. When an object, such as a motorbike is moved, a point of view 0 fixed with respect to the object is also moved, and as the point of view 0 is moved, protected images of the rest objects change.

(Race Game Displaying Method)

The race game displaying method according to the present embodiment will be explained with reference to FIGS. 6 to 11.

Figure 6:
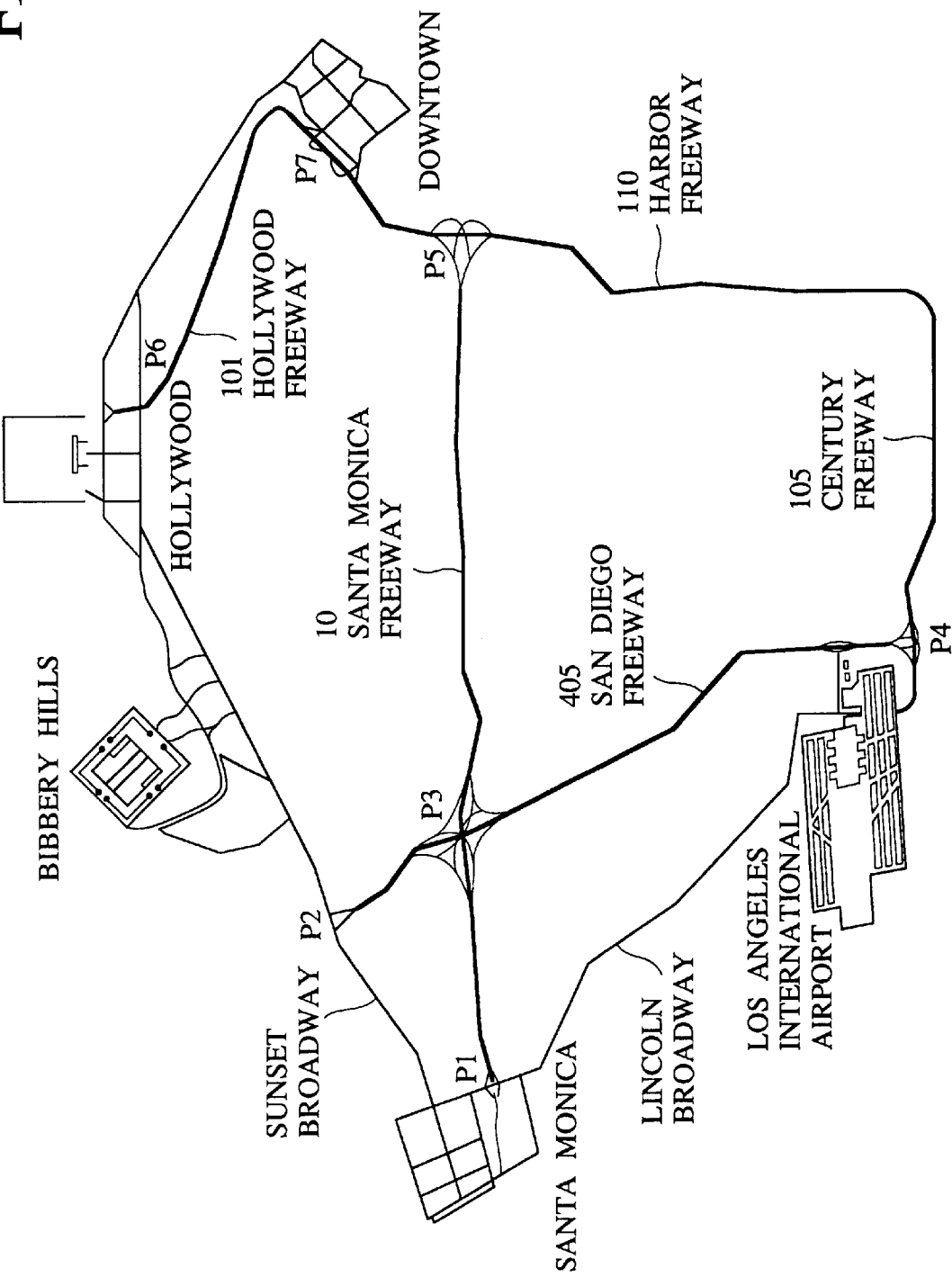
FIG. 6 is a view of an example of the virtual space of the race game apparatus according to the embodiment of the present invention.

As a virtual space of the race game according to the present embodiment, as shown in FIG. 6 the city of Los Angeles is copied. The large area containing Los Angeles Airport, Santa Monica, Beverly Hills, Hollywood, the downtown is set as an area for the race game to be played in. A game player can freely drive around anywhere in this large area on a motorbike he operates. The race game is characterized in that a game player can freely drive also in places in the area, which are other than the streets.

In the race game of the present embodiment game a destination is set, and game players compete in arriving sooner at the destination. Because the game players can drive freely in the virtual space, the game players tend to miss their current positions directions, and lose their ways. As a countermeasure to this, indications of directions to the destination are suitably made.

In the present embodiment a number of positions where direction indications are presented in the city of the virtual space are preset. When a motorbike enters an area which is near a direction indicating position at a certain distance from the position, an arrow indicating a destination is displayed. As exemplified in FIG. 6, intersections P1 to P8 of routes are set as positions of direction indications. It is possible to set positions of direction indications in front of famous stores, bus stops, etc.

Figure 7A:
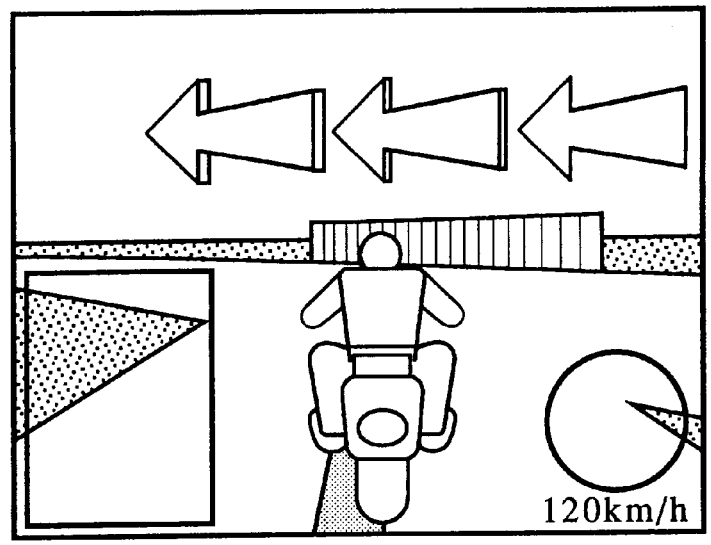
FIGS. 7A and 7B are views of examples of indicated directions of driving directions by the race game apparatus according to the embodiment of the present invention.
Figure 7B:
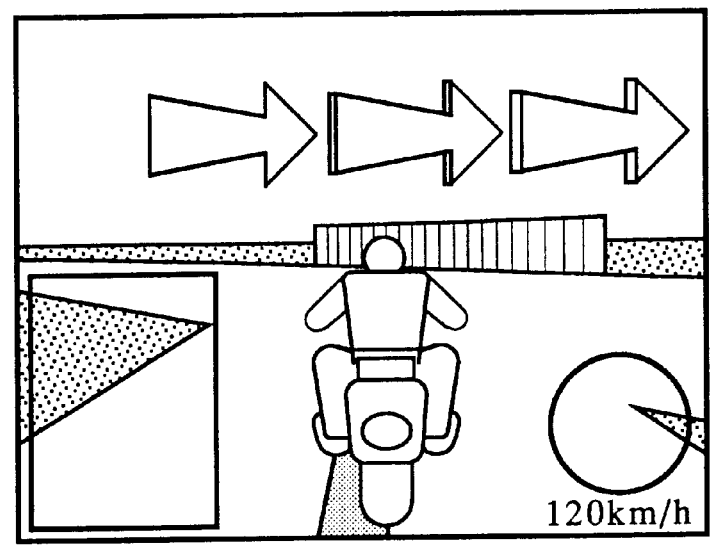
Figure 8A:
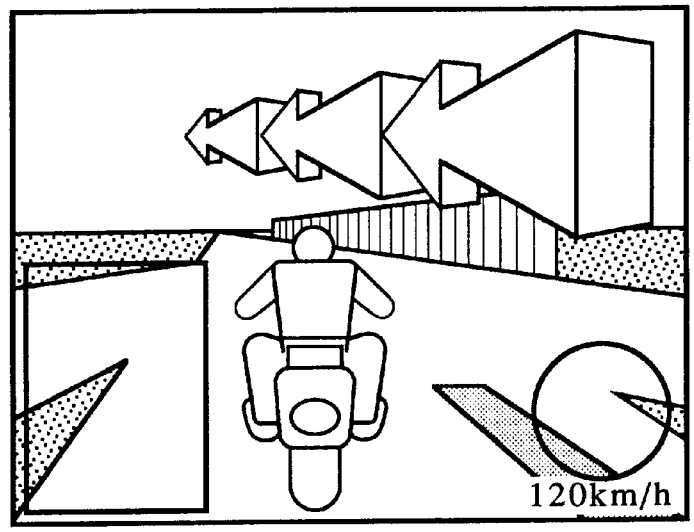
FIGS. 8A and 8B are views of examples of indicated directions of driving directions by the race game apparatus according tot he embodiment of the present invention.
Figure 8B:
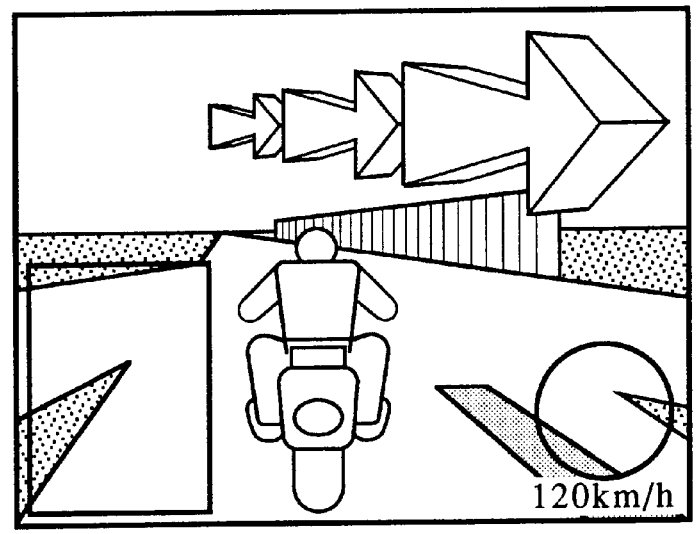

Examples of methods of indicating driving directions of the present embodiment are shown in FIGS. 7A, 7B, 8A and 8B. When a game player comes within a preset distance from a direction indicating position P1–P8, a direction of a shortest distance to a destination is indicated at the direction indicating point P1–P8. When a destination is left to the direction indicating position, the direction indication is displayed as shown in FIG. 7A. When the destination is right to the direction indicating position, the direction indication is displayed as shown in FIG. 8A. When the destination is behind the direction indicating position, the direction indication is displayed as shown in FIG. 8A. When the destination is before the direction indicating position, the direction indication is displayed as shown in FIG. 8B.

Figure 5:
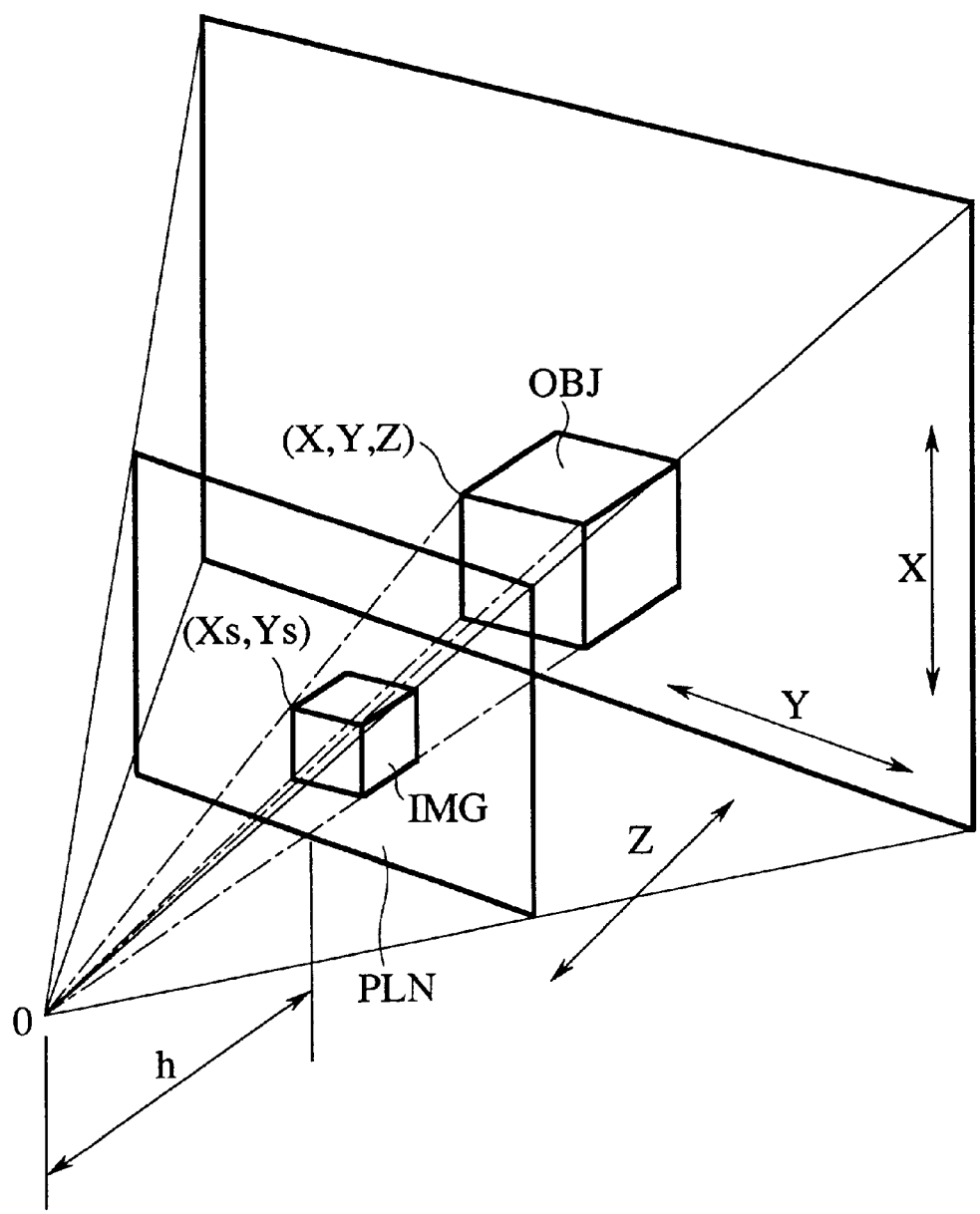
FIG. 5 is a view of the object displaying method of the race game apparatus according to the embodiment of the present invention.

The arrows in FIGS. 7A and 8B are perspective views, at different points of views, of one and the same object arranged in a three-dimensional virtual space. The two-dimensional projected image is determined by persecuting, as shown in FIG. 5, an arrow, a three-dimensional object, at a prescribed point of view.

As a display method of the arrows, three arrows shown in FIGS. 7A, 7B, 8A and 8B may be displayed as they are, or the three arrows may be displayed in their indicating directions in a sequential direction. The respective whole arrows may be flashed. In short, any display method can be used as long as the method facilitates game players understanding indicating directions.

In a case that two directions of a smallest distance to a destination at a direction indicating position, arrows indicating the two directions are synthesized, and a synthesized arrow is displayed. For example, in a case that a destination is on the left side and over there as viewed at a direction indicating position, the arrow of FIG. 7A and the arrow of FIG. 8A are synthesized for display.

The moving direction display method according to the present embodiment is characterized in that regardless of a position of a motorbike operated by a game player, a direction indication at a direction indicating position does not change. In other words, an indicated direction is determined independently of a positional relationship between a direction indicating position and a motorbike. In the conventional car navigation system, etc., a direction to be indicated is computed to be determined respectively corresponding to a position of a motorbike. In the present embodiment, however, when a destination is decided, a direction indication to be displayed at a direction indicating position in a virtual space does not change. This is very effective when a communication game is competed by a plurality of game players. When a plurality of game players participate, it takes much computing time to compute indicated directions for each participants, but in the present embodiment, directions to be indicated can be determined without computing directions for respective participants.

Whether or not a motorbike has come near a direction indicating position may be judged based on a circular region or a spherical region of a prescribed radius with the motorbike as a center, which is set as an approach area, or based on an area which covers an area in which the motorbike is anticipated to drive, based on a driving direction of the motorbike and a speed thereof.

(Method of Preventing Collision with a Person)

In the race game of the present embodiment motorbikes can be driven freely in the city of the virtual space regardless of the roads, and consequently this might cause their collisions with characters in the city. Some game players might operate the motorbikes intentionally to collide with the characters. In the present embodiment, for the purpose of preventing such situations, when a motorbike approaches a character, the character is spaced from the motorbike to prevent his collision with the motorbike.

Figure 9A:
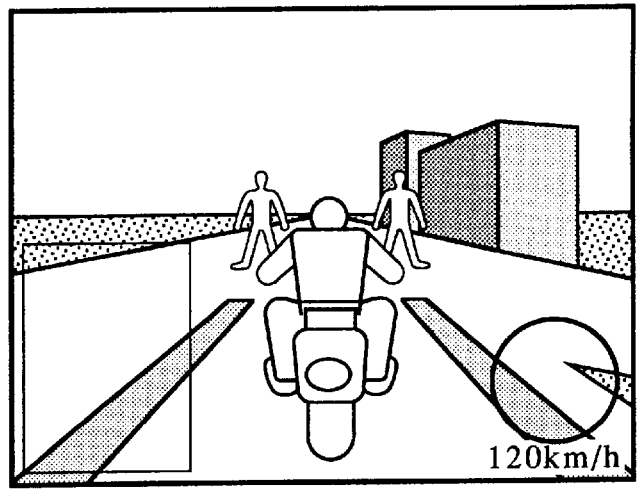
FIGS. 9A and 9B are views of examples of the method for preventing collision of a motorbike with a character of the race game apparatus according to the embodiment of the present invention.
Figure 9B:
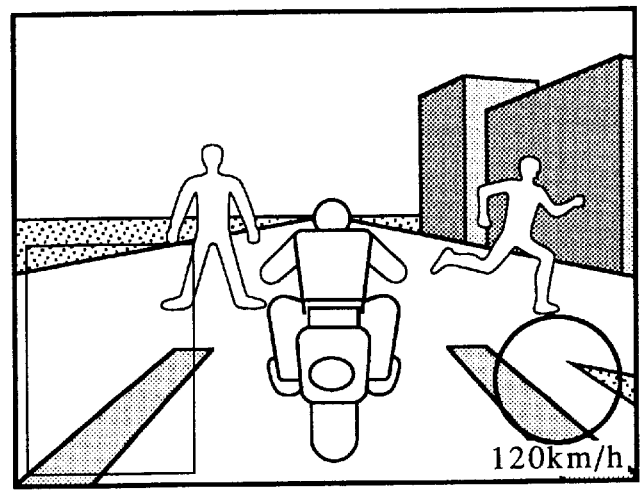

For example, when a motorbike approaches to remote characters, as shown in FIG. 9A, motions of the characters in the driving direction are stopped. When the motorbike further approaches, as shown in FIG. 9B, the characters are intentionally transversely moved. Even in a case that a game player targets a character by a motorbike, the character is intentionally moved on, and the character is never run over.

Figure 10:
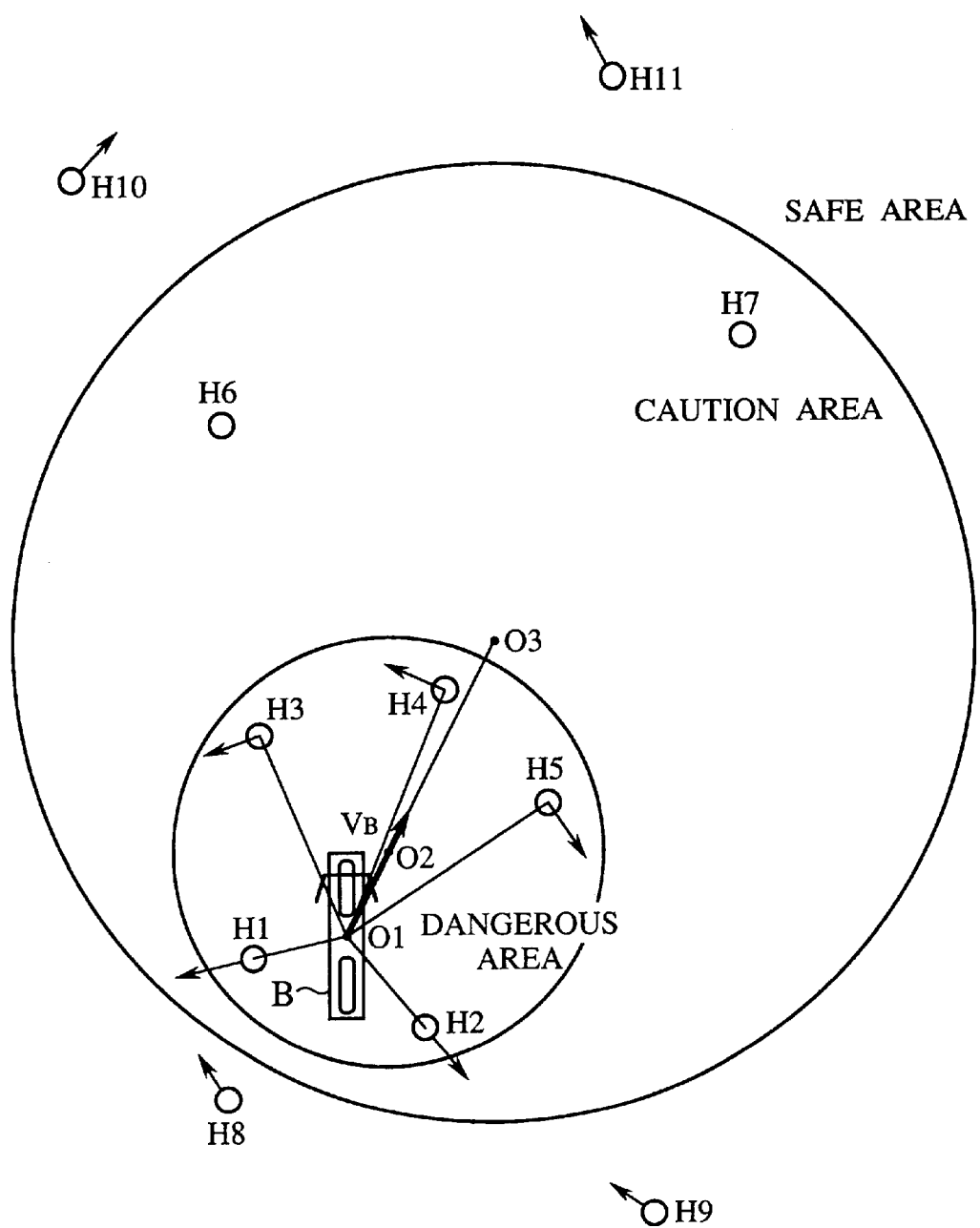
FIG. 10 is an explanatory view of an algorithm of the method for preventing collision of a motorbike with a person of the race game apparatus according to the embodiment of the present invention.
Figure 11:
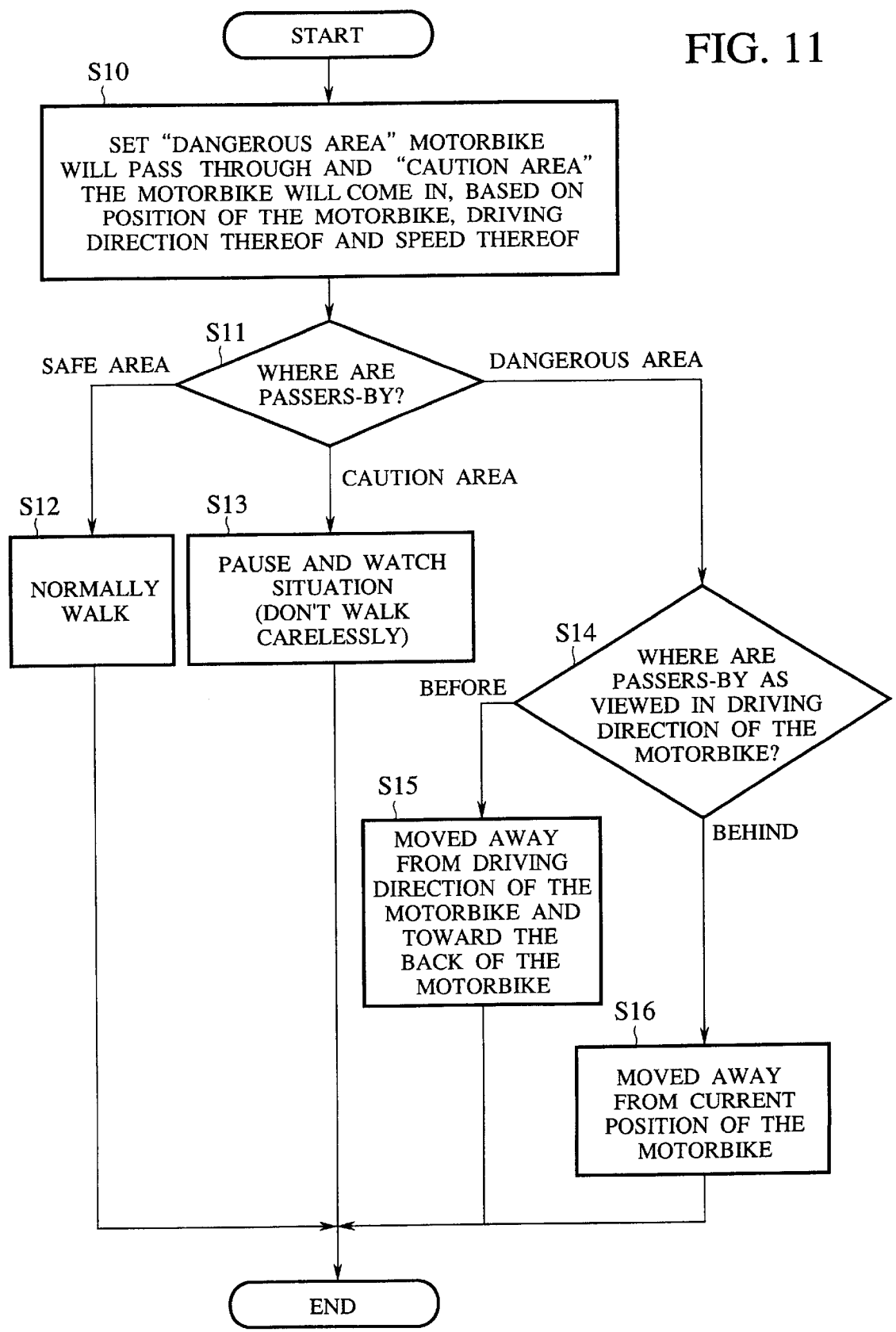
FIG. 11 is a flow chart of the method for preventing collision of the motorbike with a person of the race game apparatus according to the embodiment of the present invention.

The method for preventing collision of characters with a motorbike of the present embodiment will be detailed with reference to FIGS. 10 and 11.

First, with reference to FIG. 10 an algorithm of the method for preventing collision of characters with a motorbike will be explained.

In the present embodiment, for a driven motorbike B a dangerous area where there is a risk that the motorbike will collide with a person, a caution area where a risk that the motorbike may collide with a character, and a safety area where it is not necessary to consider a risk of collision of the motorbike with a character are set. A dangerous area and a caution area are set in consideration of a speed vector VB of a motorbike B with respect to a position of the center of the motorbike B. A dangerous area is a sphere of a radius proportional to a speed $|VB|$ of the motorbike B and containing the motorbike M with respect to a position 02 as a center shifted by a distance proportional to the speed $|VB|$ from a position of the center of the motorbike B in a direction of a speed vector VB. A caution area is a sphere of a radius proportional to the speed $|VB|$ with respect to a position 03 as a center shifted by a distance proportional to the speed $|VB|$ from the position 01 of the center of the motorbike B in the direction of the speed vector VB.

Characters in a dangerous area are intentionally moved apart from the motorbike B. As shown in FIG. 10, characters H1, H2 behind the motorbike B as viewed in the driving direction of the motorbike B are intentionally moved away from the current position 01 of the motorbike B. As shown in FIG. 10, characters H3, H4, H5 in front of the motorbike B as viewed in the driving direction of the motorbike B are intentionally moved toward the back of the motorbike B, e.g., in the directions which are normal to the straight lines interconnecting the characters H3, H4, H5 to the position 01 of the center of the motorbike B. The characters H3, H4, who are forward left of the motorbike B, are moved left, and the character H5, who is forward right of the motorbike B, is moved right.

Characters in a dangerous area are moved completely outside a dangerous area and into a safety area.

Characters in a caution area are caused to temporarily pause even when they are walking, so that they can take a smooth motion to prevent an anticipated danger. As exemplified in FIG. 10, the characters H6, H7 in the caution area are caused to pause and take a motion of watching the motorbike B.

Characters in a safety area other than a caution area are moved in accordance with a required program. As exemplified in FIG. 10, the characters H8, H9, H10, H11 in a safety area walk or run in accordance with a required program independently of motions of the motorbike B.

Then, steps of the method for preventing collision of a motorbike with a character will be explained with reference to the flow chart shown in FIG. 11.

First, based on a position of a motorbike, a driving direction thereof and a speed thereof, a dangerous area the motorbike will pass through and a caution area the motorbike will possibly pass through are decided (Step S10).

Next, it is judged in which areas passersby are present (Step S11).

When the passersby are in a safety area other than the dangerous area and the caution area, the passersby walk on without changes made to the passersby (Step S12).

When passersby are in the caution area, the passersby are caused to pause and watch situations (Step S13). This is for making motions of the characters running away from the motorbike coming nearer look smooth and for preventing the passersby from carelessly moving into the dangerous area.

When passersby are in the dangerous area, it is judged whether the passersby are before or after the motorbike with respect to the motorbike (Step S14).

Those of the passersby in front of the motorbike run in a direction toward the back of the motorbike (Step S15). They run in directions at, e.g., about 90° to the lines interconnecting a position of the motorbike and positions of the passersby. It is possible that the passersby are caused to run in direction at a prescribed angle to a driving direction of the motorbike.

Those of the passersby behind the motorbike are caused to run away from a current position of the motorbike (Step S16).

As described above, according to the present embodiment, characters are present in a city while cruel images of colliding with the characters can be prevented, and direction indications which are easily understood by operators freely driving in the city.

[A Second Embodiment]

Figure 12:
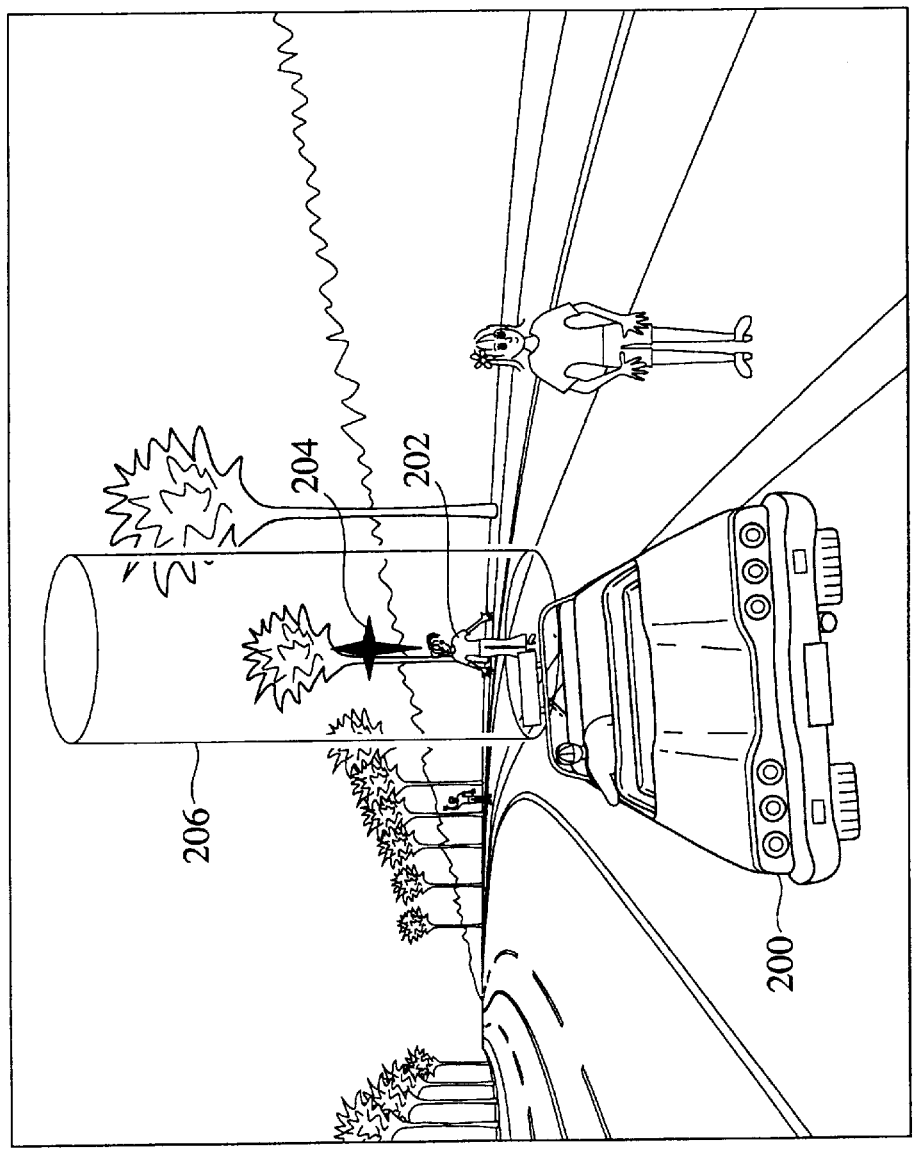
FIG. 12 is a view of an example of a display method for displaying a passenger in the taxi game according to the second embodiment of the present invention.

The game apparatus according to a second embodiment of the present invention will be explained with reference to FIGS. 12, 13 and 14.

A taxi game played on the game apparatus according to the present embodiment is a game in which a game player drives a taxicab as a taxi driver to carry passengers to destinations, and carries many passengers to destinations in a play time to compete in a earned fare amount.

The present embodiment is the same in the basic constitution as the first embodiment except that in the present embodiment a drive simulating apparatus (not shown) is not the motorbike but a taxicab.

In the game according to the present embodiment, a game player operates a taxicab, finds a passenger and get in the taxicab, carries the passenger to his destination, and receives a fare corresponding to a driven distance. The player competes in how quickly he finds a passenger and gets the passenger in his taxicab, how fast he carries the passenger to a destination told by the passenger, and how much fare amount he earns. This game competes basically in driving technique of a game player but also depends on luck as to whether passengers go long or short distances.

A first characteristic of the game of the present embodiment is a method of displaying a passenger. The method of displaying a passenger of the present embodiment will be explained with reference to the game display shown in FIG. 12.

A game player must find a passenger quickly, operating a taxicab. A plurality of people are displayed in a display image, but all the people are not passengers. A specific one 202 of the people is a passenger. The specific person is displayed distinguished over the rest of the people in the display image. To this end, as shown in FIG. 12, a mark 204 of a striking color, e.g., a red cross, is displayed above the head of the passenger 202, and furthermore, an illuminant cylindrical spot 205 is displayed to prominently light up the passenger 202. Thus, the game player can operate the taxicab 200 easily to a position of the passenger 202.

A second characteristic of the game of the present embodiment is the method for displaying a direction indication to a destination. The method of displaying a direction indication to a destination told by the present embodiment will be explained with reference to FIGS. 13 and 14.

When a game player gets a passenger 202 in his taxicab, he operates the taxicab to an indicated destination. It is necessary to tell the game player a destination. In the present embodiment, as a direction indicating object the arrows 208,210 as shown in FIGS. 13 and 14 are displayed in display images. The game player drives in the direction of the arrow 208 and can arrived at the destination.

In the present embodiment, the mode of displaying a direction indication varies depending on a distance between a current position of the taxicab 200 and a destination.

Figure 13:
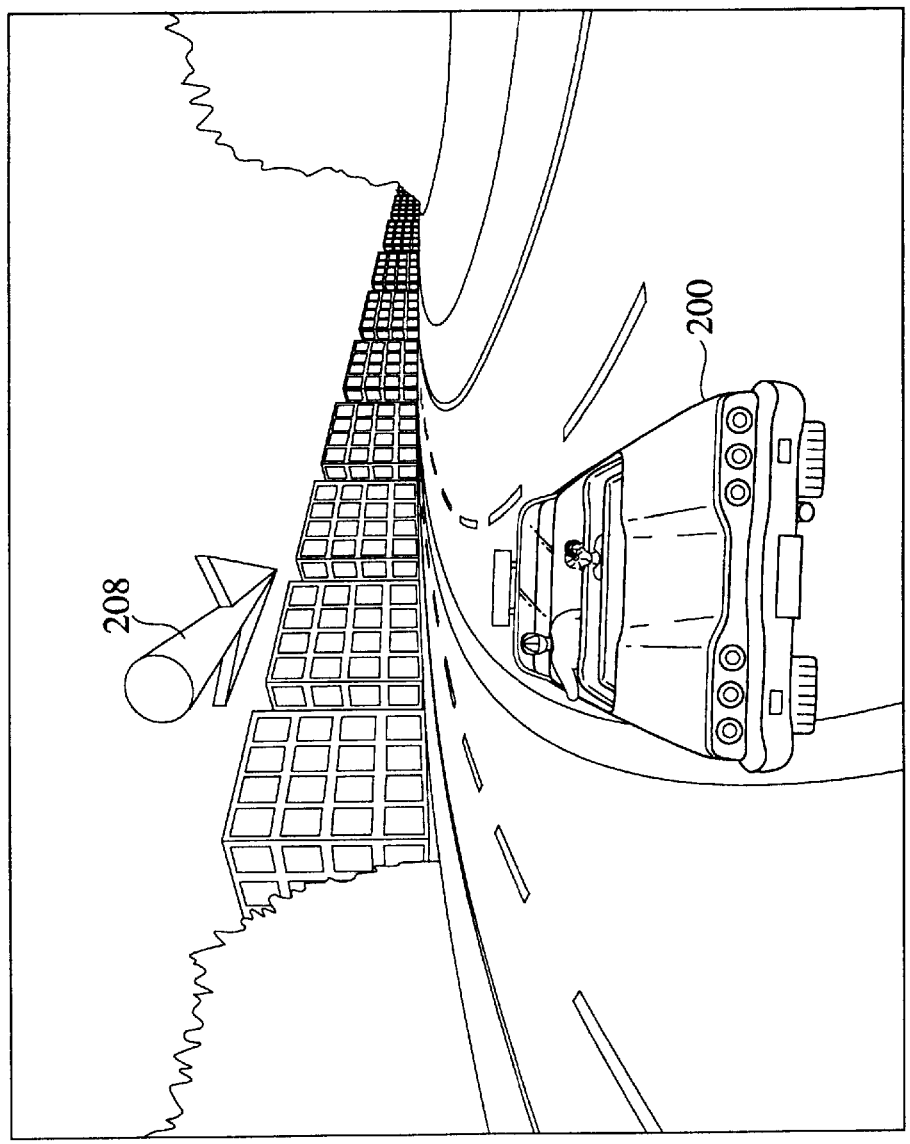
FIG. 13 is a view of an example of a driving direction indication method of the taxi game according to the second embodiment.

FIG. 13 shows a case that a distance between a current position of the taxicab 200 and a destination is longer than a prescribed distance. In this case, the arrow 208 which is displayed along a driveway, indicating a driving direction to the destination is displayed in place of the arrow 210 which directly indicates a destination at a current position is displayed. This is because, when used in this case, the latter mode may confuse the game player. In this case, the arrow 208 indicating the driveway to the destination is displayed, whereby the game player can operate the taxicab 200 correctly to the destination.

Figure 14:
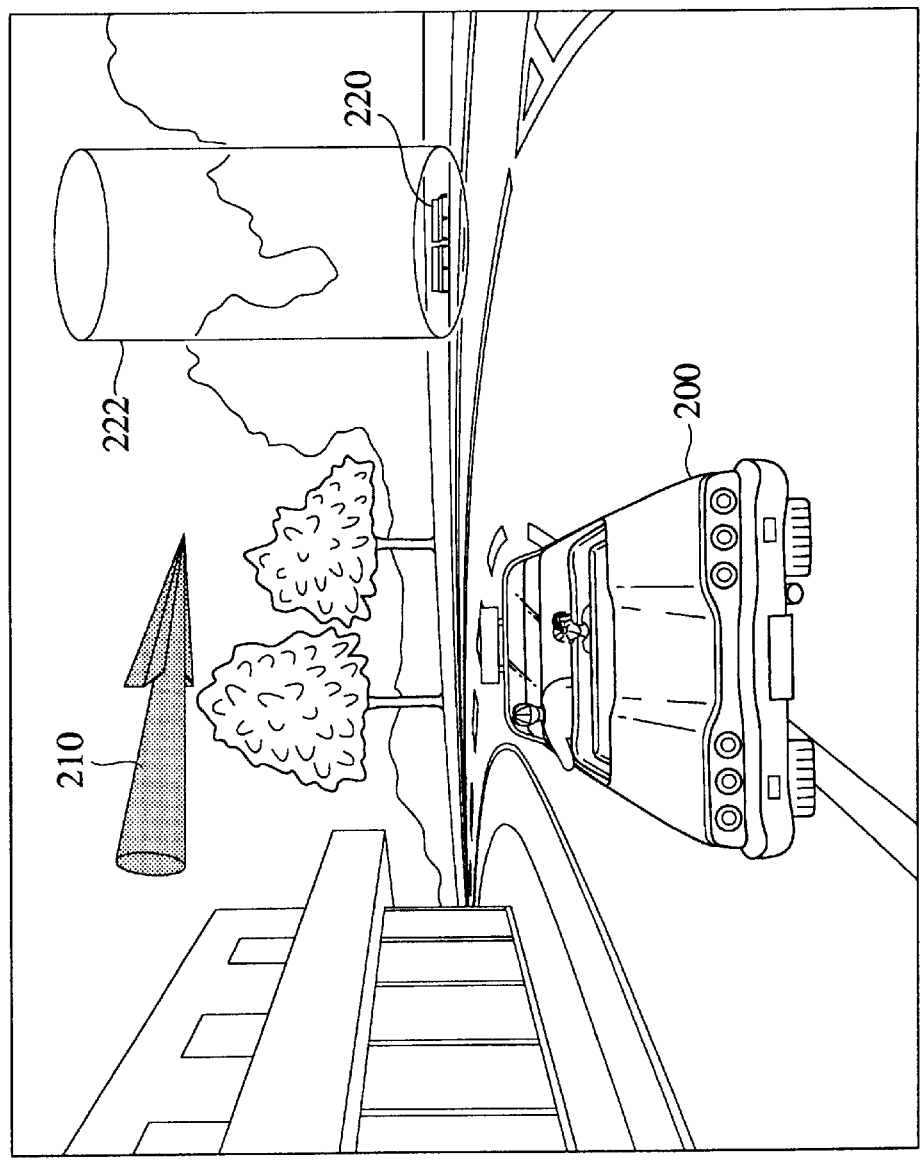
FIG. 14 is a view of an example of the driving direction indicating method of the taxi game according to the second embodiment of the present invention.

FIG. 14 shows a case that a distance from a current position of the taxicab 200 to a destination 220 is shorter than the prescribed distance. In this case, the arrow 210, which directly indicates the destination 220, is displayed, ignoring a direction of a driveway to the destination 220. This is because, when the destination 220 is near, the destination 220 is displayed together in a display image, and the arrow 210 directly indicative of the destination more facilitates the game player arriving at the destination 220. In this case, the arrow 210 directly indicating the destination is displayed, whereby the game player can operate the taxicab 200 correctly to the destination.

Furthermore, the arrow 208 used in the case of a longer distance than the prescribed distance, and the arrow 210 used in the case of a shorter distance than the prescribed distance are indicated in colors different from each other. For example, in FIG. 13, the arrow 208 is indicated in blue, and in FIG. 14 the arrow 210 is displayed in red, whereby a change of the direction indication modes is notified to the game player.

A change of the direction indication modes may be notified by, in addition to the color difference of the arrows, different shapes of the arrows, flashing the arrows, the modes shown in FIGS. 7A, 7B, 8A and 8B. Otherwise, in the game a game player may be notified by sounds, or music different from background music.

In the present embodiment, a condition for changing the direction indication modes is a distance from a current position to a destination with respect to a prescribed distance, but may be a set distance irrespective of destinations or different distances corresponding to destinations. For example, when a destination has a view, a prescribed long distance is used, and a prescribed short distance is used when a destination has no view. A distance may be set in consideration of a constitution of roads near a destination. For example, a mode is changed when the taxicab 200 passes a prescribed intersection or a prescribed building and comes near a destination. For example, a prescribed long distance is used in a direction with a view. Different conditions may be set for respective destinations.

A third characteristic of the game of the present embodiment is a method of displaying a destination. The destination display method of the present embodiment will be explained with reference to FIG. 14 by means of a game display.

A game player must quickly find a destination, operating the taxicab 200. In the present embodiment, a position of the destination is prominently displayed on a game display. As shown in FIG. 14, an illuminant cylindrical spot 222 is displayed, lighting up the destination. This facilitates the game player operating the taxicab 200 to the destination 220.

As described above, the present embodiment can provide displays which facilitate a game player, in a virtual space, such as a city or others, getting a specific object and moving the object to a destination.

[Modifications]

The present invention is not limited to the above-described embodiment and can cover other various modifications.

In the above-described embodiment the present invention is applied to, e.g., a motorbike race game and is applicable to race games of movable objects, such as cars, etc.

The algorithm of the method for preventing collisions of a motorbike with a character is usable as an algorithm of a game in which not only a collision of a motorbike with a character, but also a collision of an object to be operated by a game player with that to be operated by another game player, of a game in which a game player guides blocks to confine them in a set place, of scattering characters, animals, etc.

The present invention is applied to a game apparatus in the above-described embodiment, but is applicable electronic devices of other kinds.

What is claimed is:

1. A game display method for displaying a game in which a movable object is moved in a virtual space, comprising the steps of:

setting a dangerous area around the movable object; and when a character enters the dangerous area, moving the character in a direction in which the character is moved away from the movable object.

2. A game display method according to claim 1, wherein a caution area is set around the dangerous area, and when a character enters the caution area, the character is caused to pause.

3. A game display method according to claim 1, wherein the dangerous area is set to cover an area in a direction of movement of the movable object, based on a moving direction of the movable object and/or a moving speed thereof.

4. A moving direction display method according to claim 1, wherein the movable object can be moved unlimitedly in the area other than the movement ways in the virtual space.

5. A game display method for displaying an object in a virtual space, comprising the steps of:

setting an area around a first object; and when a second object enters the area, moving the second object outside the area, based on positional information of the first object and positional information of the second object.

6. A game display method according to claim 5, wherein when the second object enters the area, the second object is moved in a direction intersecting at a prescribed angle to a direction interconnecting a reference position of the first object and a reference position of the second object.

7. A game display method for moving to a destination in a virtual space a movable object which is moved in the virtual space, comprising the step of:

displaying at a prescribed position in the virtual space a virtual object which indicates a direction from the prescribed position to the destination.

8. A moving direction display method for displaying a moving direction of a movable object which is moved in a virtual space to a destination therein, comprising the steps of:

setting in the virtual space a plurality of moving direction indicating positions for indicating moving directions; and displaying arrows which are directed from the direction indicating positions to the destination being displayed and are not dependent on positional relationships between the direction indicating positions and the movable object when the movable object comes near to the direction indicating positions, whereby a moving direction for the movable object to move on is indicated.

9. A moving direction display method according to claim 8, wherein the direction indicating positions are set at intersections of movement ways in the virtual space.

10. A game apparatus for executing a game in which a movable object is moved in a virtual space, comprising:

setting means for setting a dangerous area around the movable object; and display means which, when a character enters the dangerous area, the character is displayed to move in a direction in which the person moves away from the movable object.

11. A game apparatus according to claim 10, wherein the setting means sets a caution area around the dangerous area; and the display means which, when a character enters the caution area, displays the character to pause.

12. A game apparatus according to claim 10, wherein the setting means sets the dangerous area to cover an area in a moving direction of the movable object, based on a moving direction of the movable object and/or a moving speed thereof.

13. A game apparatus for executing a game in which a movable object is moved in a virtual space, comprising:

setting means for setting an area around a first object; and display means which, when a second object enters the area, displays the second object to move outside the area, based on positional information of the first object and positional information of the second object.

14. A game apparatus according to claim 13, wherein the display means displays the second object to move in a direction intersecting at a prescribed angle to a direction interconnecting a reference position of the first object and a reference position of the second object.

15. A game apparatus for executing a game in which a movable object which is moved in a virtual space is moved to a destination in the virtual space, comprising:

display means for displaying at a prescribed position in the virtual space a virtual object indicating a direction from the prescribed position to the destination.

16. An electronic device for displaying a moving direction of a movable object being moved to a destination in a virtual space, comprising:

setting means for setting in the virtual space a plurality of moving direction indicating positions for indicating moving directions; and display means for displaying direction indicating objects which, when the movable object comes near the direction indication position, are directed from the moving direction indicating positions to the destinations and are not dependent on positional relationships between the moving direction indicating positions and the movable object, the direction indicating objects indicating moving directions for the movable object to move in.

17. A driving direction display method for displaying a driving direction for a movable object to drive to a destination in a virtual space, when a current position of the movable object is away from the destination by a prescribed distance, a direction indicating object which is along a driveway from the current position to the destination being displayed, and when the current position of the movable object is within the prescribed distance from the destination, a direction indicating object directed from the current position to the destination is displayed, whereby the driving direction of the movable object is indicated.

18. A driving direction display method according to claim 17, wherein effective sounds and/or screen display modes used when the current position of the movable object is away from the destination by a distance longer than the prescribed distance and used when the current position of the movable object is within the prescribed distance from the destination are different from each other.

19. A driving, direction display method for displaying a driving direction for a movable object to drive to a destination in a virtual space, when a current position of the movable object is away from the destination by a prescribed distance, a first direction indicating object which is along a driveway from the current position to the destination being displayed, and when the current position of the movable object is within the prescribed distance from the destination, a second direction indicating object directed from the current position to the destination is displayed, whereby the driving direction of the movable object is indicated.

20. A driving direction display method according to claim 19, wherein the first direction indicating object and the second direction indicating object are different from each other in shape, color and/or display mode.

21. A display method for displaying a game in which a movable object which is movable in a virtual space is moved to a destination in the virtual space, at least when a current position of the movable object is within a prescribed distance from the destination, the destination is emphatically displayed.

22. A display method for displaying a game in which a movable object which is movable in a virtual space gets a specific object at a prescribed position in the virtual space and is moved to a destination in the virtual space, wherein a position of the specific object is emphatically displayed.

23. An electronic device for displaying a driving direction for a movable object to move to a destination in a virtual space, comprising:

display means for, when a current position of the movable object is away from the destination by a prescribed distance, displaying a direction indicating object which is along a driveway from the current position to the destination, and, when the current position of the movable object is within the prescribed distance from the destination, displaying a direction indicating object directed from the current position to the destination, wherein the driving directions of the movable object being indicated by the direction indicating objects.

24. An electronic device for moving a movable object which is movable in a virtual space to a destination in the virtual space, comprising:

display means for, at least when a current position of the movable object is within a prescribed distance from the destination, emphatically displaying the destination.

25. An electronic device for displaying a game in which a movable object which is movable in a virtual space gets a specific object at a prescribed position in the virtual space and is moved to a destination in the virtual space, comprising:

display means for emphatically displaying a position of the specific object.

26. A storage medium for storing a program for executing a method recited in one of claims 1 to 9 and claims 17 to 22.

* * * * *